J US007503963B2

United States Patent
Jordan et al.

(10) Patent No.: US 7,503,963 B2
(45) Date of Patent: *Mar. 17, 2009

(54) CLEANING AND POLISHING WAX COMPOSITION

(75) Inventors: Elsie A. Jordan, Temecula, CA (US); Wen-Chen Su, Lexington, KY (US); Hida Hasinovic, Lexington, KY (US); Michael A. Dituro, Huntington, WV (US); Frances E. Lockwood, Georgetown, KY (US)

(73) Assignee: Ashland Licensing And Intellectual Property LLC, Dublin, OH (US)

( * ) Notice: Subject to any disclaimer, the term of this patent is extended or adjusted under 35 U.S.C. 154(b) by 148 days.

This patent is subject to a terminal disclaimer.

(21) Appl. No.: 11/005,321

(22) Filed: Dec. 6, 2004

(65) Prior Publication Data

US 2005/0155515 A1     Jul. 21, 2005

Related U.S. Application Data

(60) Provisional application No. 60/527,398, filed on Dec. 5, 2003, provisional application No. 60/535,264, filed on Jan. 9, 2004.

(51) Int. Cl.
    *C09G 1/12*         (2006.01)
    *C09G 1/02*         (2006.01)
    *C09G 1/04*         (2006.01)

(52) U.S. Cl. .................. 106/3; 106/10; 106/11; 106/271; 106/272; 516/55; 516/77; 516/79; 516/93

(58) Field of Classification Search ............ 106/3, 106/10, 11, 271, 272; 516/55, 77, 79, 93
See application file for complete search history.

(56) References Cited

U.S. PATENT DOCUMENTS

| | | | |
|---|---|---|---|
| 5,294,248 | A | 3/1994 | Chittofrati et al. |
| 5,645,633 | A | 7/1997 | Ogawa |
| 5,817,160 | A | 10/1998 | Nagpal et al. |
| 6,156,108 | A | 12/2000 | Wachowiak, Jr. |
| 6,159,551 | A | 12/2000 | Yeiser et al. |
| 6,533,850 | B1 | 3/2003 | Kaiser et al. |
| 6,562,114 | B1 | 5/2003 | Yeiser et al. |
| 2003/0047710 | A1 | 3/2003 | Babu et al. |
| 2003/0075077 | A1 | 4/2003 | Lewis |
| 2003/0092360 | A1 | 5/2003 | Beitel et al. |

*Primary Examiner*—C. Melissa Koslow
(74) *Attorney, Agent, or Firm*—Wood, Herron & Evans, LLP.

(57) ABSTRACT

A water in oil emulsion wax composition composed of natural and synthetic waxes, surfactants, suspending agents, and aluminum oxide particles of high purity of 0.20 micrometer or less containing no magnesium oxide and being agglomerate free together with a aliphatic hydrocarbon solvent producing a wax having cleaning properties and an enhanced high gloss surface from a single application.

38 Claims, 1 Drawing Sheet

Surface Comparison

Waxed Surface*
Ra=0.006 μm
PV=0.3292 μm

Scratched Surface*
Ra=0.0116 μm
PV=1.0479 μm

* Measurements are for filtered profile with form removed.

CLEANING AND POLISHING WAX COMPOSITION

This application claims priority from U.S. Provisional Application Ser. No. 60/527,398 filed on Dec. 5, 2003 and U.S. Provisional Application Ser. No. 60/535,264 filed on Jan. 9, 2004, wherein both applications are incorporated herein.

BACKGROUND OF INVENTION

1. Field of Invention

This invention relates to a water in oil emulsion containing both natural and synthetic waxes together with a suspension agent(s), surfactant(s), polishing agents, and high purity aluminum oxide particles of 20 micrometers or less that cleans and provides a high gloss on automobile exterior surfaces and is applied to a clean surface.

2. Description of the Prior Art

There are numerous wax products available on the market to protect and polish the painted body surfaces of an automobile and also various different ways of applying the same. The most recommended procedure is to wash and dry the painted surface, apply the protective finish to the clean dry surface, and then buff the surface. The applied wax remains as a protective finish throughout several subsequent washes but it is a time consuming labor intensive procedure.

A quick wax job is obtainable in an automatic or semiautomatic car-wash where a detergent is applied to the surface of the vehicle under high water pressure and/or using a water and detergent solution together with strips of absorbent material or sponges to remove the dirt. As part of the car-wash liquid wax may be sprayed onto the vehicle and allowed to drip dry or be dried using an air blower. The wax compositions used by professional car washes that are applied while the automobile painted surface is wet are immediately subjected to a blow dry step and is not buffed. Neither of the latter two wax compositions and procedures of applying the same provide long lasting satisfactory results.

Conventional commercial waxes and polishes typically contain a wax dispersed in water or dissolved in a solvent often together with abrasives for dry application to a painted surface of a automobile. The wax dries and is removed with hand or mechanical buffing machines requiring considerable labor and time.

Polishing compounds, especially those defined as cleaner waxes are generally formulated with abrasive materials such as aluminum oxide of larger than 0.20 micrometer particle size. When polishing a car's painted surface, the cleaner waxes remove contaminants; however, the application and removal of same typically leaves a clean but dull surface. At least a second step of waxing is required with a polishing compound which typically incorporates a high percentage of natural or synthetic waxes and a minimum amount or no abrasive material in order to achieve a coat of wax having a high gloss appearance.

SUMMARY OF THE INVENTION

A principal object of the present invention is to provide a cleaning and polishing wax composition which functions as a cleaner wax to remove dirt and particles of contamination and yet provides a high gloss finish in a single application.

A wax composition comprising a water in oil emulsion in an effective amount to form a protective wax film on a substrate, comprising an aliphatic hydrocarbon; a carnauba wax micro emulsion; a silicone oil blend comprising a liquid dimethylpoysiloxane; a alkyl quaternary ammonium montmorillonite; an isoparaffinic solvent; a polvalkylene oxide-modified polydimethylsiloxane block copolymer product; an anhydrous aluminum silicate; a polishing agent comprising an aluminum oxide having an average particle size of 20 micrometers or less; and the remainder water.

Selected constituents comprising the formulation of Applicant's instant invention are added as emulsified components; however, the formulated product is a blend of components mixed together, and is not dependent upon use of an emulsifier in order to disperse all of the various components together in the final product as is taught by conventional waxes applied to a dry surface.

In keeping with this object there is provided in accordance with the present invention a water in oil wax composition for use on vehicular exterior painted metal or painted plastic surface, chrome, stainless steel, plastic moldings, vinyl tops and trim, fiberglass, and/or rubber surfaces. The cleaning and polishing wax composition contains both natural and synthetic waxes together with a suspension agent(s), surfactant(s), and high purity aluminum oxide having a (nano) particle size of 20 micrometers or less that cleans and provides a high gloss on automobile exterior surfaces and is applied to a clean dry surface. The preferred aluminum oxide is agglomerate free and contains no magnesium oxide. The particle size is a key factor in improving the instant wax composition.

It is another object of the present invention to product a one step single application cleaning and polishing wax composition with the desired characteristics of emulsifiability, malleability, durability, and solidity at ambient temperature having a melting or softening point in the range of from about 80° C. to about 86° C.

It is another object of the present to utilize a natural wax having a cationic charged micro emulsion as a delivery system.

Other objects, features, and advantages of the invention will be apparent with the following detailed description taken in conjunction with the accompanying drawings showing a preferred embodiment of the invention and appended claims.

BRIEF DESCRIPTION OF THE DRAWINGS

A better understanding of the present invention will be had upon reference to the following description in conjunction with the accompanying drawings in which like numerals refer to like parts throughout the several views and wherein.

DESCRIPTION OF THE PREFERRED EMBODIMENT

Figure 2:
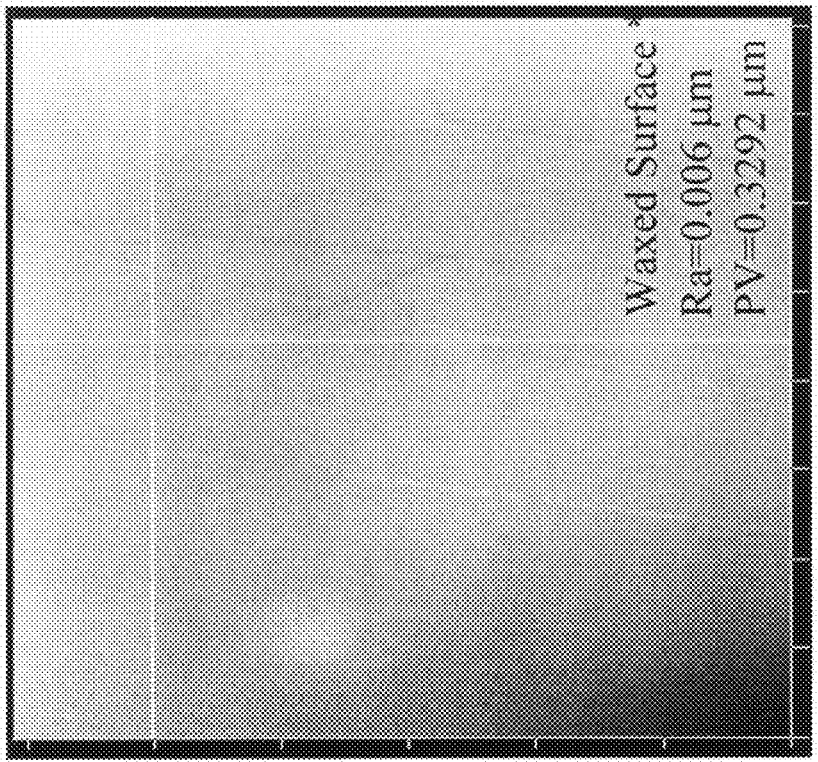
FIG. 2 is a microphotograph of the panels of FIG. 1 after application of the wax formulation as set forth in Example 1, showing filled scratches and a smoother surface whereby the surface can be evaluated on an optical profilometer.
Figure 1:
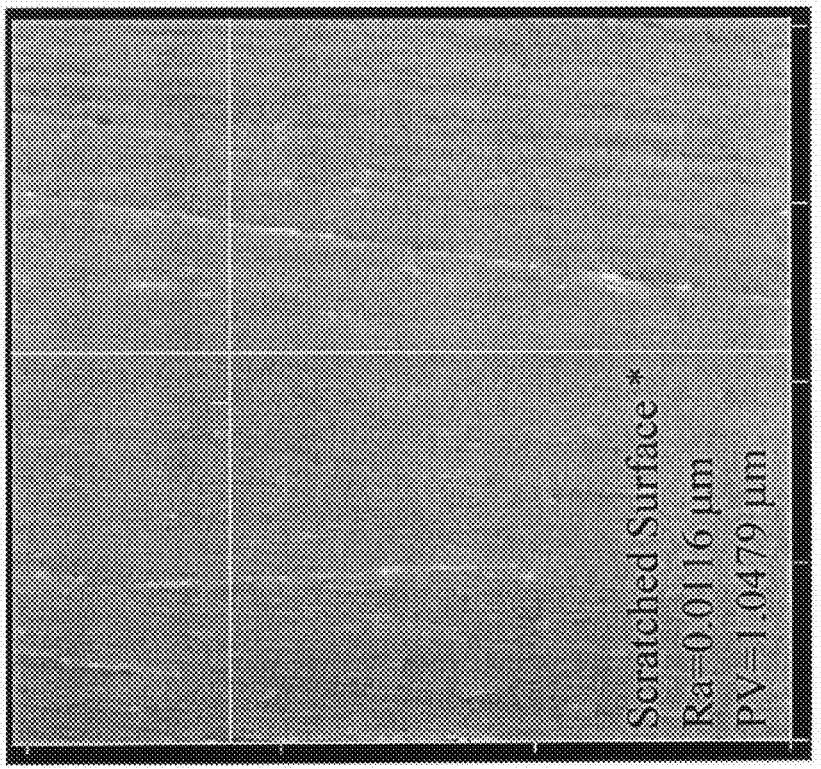
FIG. 1 is microphotograph of a panel scratched using diamond paste which are divided into sets and waxed with the formulation set forth in Example 1 for comparison evaluation at several points on the surface after waxing.

The instant invention is particularly directed to reducing the effort of providing a glossy finish on the painted exterior surface of a vehicle such as an automobile or the like by combining the step of applying a cleaner wax and a polishing wax in a single application. The exterior surface of the automobile is washed in a conventional manner using appropriate conventional cleaning agents such as detergents in the water and the surface is then rinsed using clean water. The surface is dried after rinsing and before the wax is applied thereto.

One preferred embodiment of the instant invention comprises a wax composition utilizing a selected amount of blended components and solvent for providing a cleaning action to the vehicle surface and leaving a residue of wax which upon buffing yields a high gloss surface.

One preferred wax composition comprises a water in oil emulsion containing a cationic carnauba wax micro emulsion, a silicone oil emulsified, alkyl quaternary ammonium montmorillonite, polyglycerol ester of oleic acid, aliphatic hydrocarbons, synthetic isoparaffinic hydrocarbons, water, anhydrous aluminum silicate, and high purity aluminum oxide having a particle size of 20 micrometers or less.

More particularly, a preferred wax composition is composed of a water in oil emulsion having about 10 to 20 percent of soft or demineralized water; solvent in an amount of about 20 to 45 percent by weight; a cationic carnauba wax micro emulsion in an amount of about 10 to 20 percent by weight, an emulsified silicone oil comprising a blend of liquid dimethyl polysiloxanes in an amount of from about 8 to 15 percent by weight, an alkyl quaternary ammonium montmorillonite in an amount of from about 1 to 3 percent by weight, a polyglycerol ester of oleic acid in an amount of from about 1 to 2 percent by weight, an aliphatic hydrocarbon in an amount of about 25 to 40 percent by weight, a synthetic isoparaffinic hydrocarbons such as ISOPAR E, and/or ISOPAR G an isoparaffinic solvent in an amount of from about 1 to 5 percent by weight, an anhydrous aluminum silicate in an amount of from about 1 to 5 percent by weight, and a high purity aluminum oxide in an amount of from about 1 to 3 percent by weight having a particle size of about 20 micrometers or less. One of more fragrances can be optionally added in an amount of from about 0.20 to 0.40 percent by weight. It is recommended as an option to add a biocide such as DANTOGARD or SURCIDE in an amount up to 1 percent by weight of the total composition.

The resulting composition is a light brown liquid emulsion having solid contents of about 18 to 20 percent by weight. Application to a painted surface or other surface to be treated applied as a liquid or semi-solid paste results in an easy wiping and removal of excess product from the surface resulting in a glossy surface without streaks. A preferred method of application is applying with a sponge onto the dry surface whereby upon drying the surface is then buffed with a cloth, sponge, and/or other absorbent material to dry and simultaneously buff the same. The oil based composition provides a composition capable of cleaning and polishing in a single step.

The water in oil emulsion of the present invention forms at least two phases. The organic phase containing the wax product constitutes from about 80 to about 90% by weight of the total composition and the water phase constitutes the remaining portion of the total composition of about 10% to about 20% by weight. An emulsifier which may also be a surfactant stabilizes the emulsion preventing separation into separate phases. Both the aqueous phase and/or the solvent phase may include thickening agents, emulsifiers, surfactants, suspension agents, colorants, fragrances, and preservatives.

The water in oil emulsion of the present invention contain at least one emulsifier comprising an emulsifying agent of surfactants which is compatible in the predominantly aliphatic hydrocarbon mixture phase. A preferred emulsifier is polyglycerol ester of oleic acid. It is contemplated that other suitable emulsifiers may be selected from the group comprising sorbitan polyoxyethylene, sorbitan sesquioleate, sorbitan trioleate, and polyoxyethylene trioleate. The amount of emulsifier can vary. It is recommended that the least amount of emulsifier be used to provide an effective amount capable of maintaining a stable emulsion.

A long chain fatty alcohol provides a nonionic surfactant which includes cetyl, stearyl alcohol, ethoxylated fatty alcohol, cetyl palmitate, cetyl myristate, polyethylene glycol stearate, glyceryl monostearate, monolactate, monooleates, tallow triglycerides and ethoxylated esters. Polyoxyethylene sorbitan monooleate, alkyl glucosinates, ethoxylated cetyl alcohol, ethoxylated stearyl alcohol, and polyoxyethylene nonylphenol represent suitable ethoxylated esters.

The concentration of the emulsifier is added in an amount of from 0.1 to 2% by weight, more preferably from about 0.5 to 2% by weight, and more preferably in an amount of from about 0.75 to about 1.5% by weight. One preferred embodiment utilizes a concentration of 1.0 percent by weight.

The polish comprises a water in oil emulsion. The minor component being water and the major component is a combination of an aliphatic hydrocarbon solvent and a wax product including additives thereto. The ratio of water to the combination of solvent and wax product is in a ratio of about 1:4 to about a 1:9 whereby the value of 1 represents the water. Typically the water used in the formulation is soft or demineralized water.

Solvents useful in the formulation are predominately aliphatic hydrocarbon solvents and other light distillates. For instance, hydrocarbons containing up to 100 percent aliphatic hydrocarbons are most preferable and hydrocarbons containing less than 1 percent aromatic content are deemed very desirable. Also useful are solvents typically containing from about 100 to 90 percent aliphatic hydrocarbons. Solvents deemed suitable which contain less than 10% aromatic hydrocarbons include odorless mineral spirits, Stoddard solvent, and mixed alkanes that have a flash point of about 40° C. Another useful light distillate is CALUMET 420-460 (LVP-100). The solvent concentration can vary from about 25% to about 45% by weight of the final formulation. As shown in Example 1 the odorless mineral spirits is utilized at about 39.8 percent by weight of the total composition. As shown in Example 2 replaces the odorless mineral spirits with a light distillate sold under the trade name of CALUMET 420-460 (LVP100), which is utilized at about 29.75 percent by weight of the total composition. LPA-170 may also be used instead of CALUMET 420-460 LPA-170 is available from Condea Vista Company. It is a high purity mixture of hydrotreated isoparaffins and naphthenics with very low levels of aromatics. The solvent is clear and contains low levels of normal paraffins resulting in a solvent having a higher solvent strength and lower freeze point than competitive low-aromatic solvents with equivalent boiling ranges. LPA 170 is composed of about 60% paraffinic, 40% naphthenic and only about 0.2% aromatic hydrocarbons and has a boiling point range of 415-450° F.

In addition to the aliphatic hydrocarbon, an organic solvent is added to the wax composition to aid in cleansing and aid in the removal of residual water upon application of the product on a wetted surface. Organic solvents useful in the present invention include isoparaffins, aliphatic hydrogen solvents, paraffinic solvents, paraffins, synthetic isoparaffinic solvents. One preferred organic solvent is sold under the trade name of ISOPAR E or ISOPAR G which are synthetically produced isoparaffinic solvent sold by ExxonMobil Chemical Company. The isoparaffinic solvents are highly aliphatic compounds containing a high percentage of isoparaffins. The organic solvents used in the present invention are typically considered high boiling solvents having a low vapor pressure typically less than 1.0 mm Hg at 20° C. and preferably 0.1 mm Hg or less at 20° C. Furthermore, the most preferred ISOPAR solvents reportedly have a vapor pressure of about 10 mm Hg at 38° C. and more preferably have a vapor pressure of about 4 mm Hg at 38° C. The evaporation rate is an important criteria in selection of the organic solvent. The high boiling solvent is added in an effective amount up to 25 percent by weight, more preferably in a range of from between 0.01 to 15.0 percent by weight, more preferably in a range of from 0.1 to 10.0 percent by weight, more preferably in a range of from between 1.0 to 8.0 percent by weight based on the total weight of the composition. One preferred embodiment described in Example 1 of the present invention includes about 5.0 percent by weight of ISOPAR E based on the total weight of the composition blend. Example 2 utilizes 15 percent by weight of ISOPAR G based on the total weight of the composition in view of the faster rate of evaporation of ISOPAR G. The MSDS sheets for the ISOPAR solvents E and G are hereby incorporated by reference.

The wax product can comprise a synthetic wax instead of, or in addition to, the natural waxes; however, the preferred embodiment utilizes both synthetic and natural waxes and more particularly a wax having a cationic charge whereby the wax provides a surface-active substance in which the active constituent is the positive ion. The combination of the wax or combination of waxes and the selected solvent in the final composition comprise at least 2.4% of the total composition. Preferably the combination of solvent and wax product comprises at least 47% of the weight of the total composition.

The preferred wax component is carnauba wax, more particularly a cationic carnauba wax micro emulsion. It is contemplated that alternate plant waxes such as candelilla, orange-peel, montan, and/or japan wax could be utilized in the present invention as alternate wax components, preferably in a cationic micro emulsion. It is contemplated that synthetic waxes such as polyethylene wax, polypropylene wax, polyamide wax, and combinations thereof can also be utilized in the instant invention.

The instant invention preferably utilizes at least one natural wax such as carnauba wax. The wax is provided as a micro emulsion, typically a cationic emulsion consisting of about 12-15 percent by weight wax. Of course the wax could be obtained dry and dispersed within the blend of components separately from the emulsion providing the same functional qualities; however, it is more convenient to obtain the wax in the form of an emulsion from commercial vendors. The wax emulsion consisting of about 12% wax is added to the wax composition blend in an effective amount to form a thin film on a wetted surface upon buffing, ranging from 0.001 to 6.0 percent by weight, and more preferably in a range of from 0.01 to 1.0 percent by weight, and more preferably in a range of from between 0.01 and 0.1 percent by weight based on the total weight of the composition. One preferred embodiment uses 20 percent by weight of a 12% carnauba emulsion.

A wax comprising a silicone one or more of liquid dimethyl polysiloxanes is used in the present invention to aid in spreading and enhance the gloss of the product upon application. The dimethyl polysiloxane is typically obtained commercially as a silicone oil which is added to the blend of other constituents and mixed together to form the final wax composition. Dimethyl polysiloxane from Dow Corning sold under the trademark 200 FLUID or from General Electric sold under the trademark SF96 polydimethylsiloxane fluid. As reported in General Electric's formulary guide at http://www.gesilicones/com/silicones/americas/business/industries;.../formulary-guide.shtm on February of 2002, these fluids are often characterized as amine functional fluids, however, they are actually curable polymers containing reactive alkoxy groups which upon hydrolyzation convert to silanol (OH) units. The silanol further react to form a cross-linked siloxane linkage (Si—O—Si) on the polish surface. These amine groups increase the bonding properties to the polish surface either through ionic attraction or chemical reaction. The ionic and/or chemical bond insures resistance to detergent wash-off or micro abrasion during use of the polished surface.

For example, the dimethyl polysiloxane solution described in Example 1 contains 27.9 percent by weight water and 7.9 percent by weight silicon based on the total weight of the composition.

Moreover, polishes use fluids from 50 to 60,000 centistokes viscosity. Lower viscosity fluids provide better leveling and adequate gloss; however, higher viscosity fluids are better for higher gloss and depth of color. High viscosity systems are better lubricants for high wax systems. However, high viscosity fluids may exhibit poor rub out and leveling properties, or even bronzing. The high and low viscosity fluids can be blended to optimize the desired characteristics.

An effective amount of the dimethyl polysiloxane or blend thereof comprising an effective amount of from 5% to 20% by weight can be used in the present invention and more particularly in a range of from 8.0% to about 15.0% by weight of the total composition. One preferred embodiment uses an effective amount of dimethyl polysiloxane in an amount of about 13.5 percent by weight of the total composition.

Embodiments characterized by Examples 1-3 of the present invention utilize a blend containing 4.2 percent by weight of the total composition of silicone fluid having a 350 cst and 2 percent by weight of the total weight of the wax composition of silicon fluid having a 100 cst in order to impart the desired leveling characteristics for the wax composition. About 0.8 percent by weight of the total composition is comprised of a silicone fluid having a 100000 cst value to impart the desired gloss characteristics. The MSDS sheets of GE Silicon Fluids 350 cst, 100 cst and 10000 cst are hereby incorporated by reference herein.

As set forth in Examples 1-3, General Electric silicon fluid sold under the brand name of SF1706 is used in an amount of 1 percent by weight of the total weight of the wax composition to extend the durability of the wax and act as a protectant. The MSDS sheets of GE Silicon Fluids SF 1706 is hereby incorporated by reference herein.

As set forth in Examples 1-3, General Electric silicon fluid sold under the brand name of SF1550 is used in an amount of 1 percent by weight of the total weight of the wax composition to extend the durability of the wax and act as a protectant. The MSDS sheets of GE Silicon Fluids SF 1550 is hereby incorporated by reference herein.

The wax composition of the present invention utilizes a thickening agent which may also aid in the suspension of particles in the emulsion. A preferred thickening agent is alkyl quaternary ammonium montmorillonite, a type of clay, in an amount of from 0.1 to 4 percent by weight and more preferably from about 1 to about 3 percent by weight of the total composition. The alkyl quaternary ammonium montmorillonite functions as a dispersant or thixotrope commercially available as CLAYTONE AF thixotrope from E.C.C. America, Inc. and works particularly well with the cationic carnauba wax micro emulsion. One preferred embodiment utilizes about 2.2 percent by weight fo the total composition of alkyl quaternary ammonium montmorillonite.

Anhydrous aluminum silicate is a polishing agent used in the instant composition. It is typically a clay which contains varying proportions of $Al_2O_2$ and $SiO_2$ which may contain crystals or whiskers up to 1 centimeter long.

A particularly important constituent is the use of nano particles of high purity aluminum oxide having an average particle size of about 0.20 micrometers or less as measured using a Sedigraph 5100-MPD(D50) Sedigraph 5100 obtained from Micromeritics Instrument Corporation. The particles range in size up to 0.2 micrometers. The particles are defined as a high purity alumina grade RC-UFX MAR (no Magnesium oxide), and agglomerate free which was available from Reynolds Metals Company and later sold to Baikowski. Because most polishing compounds are generally formulated with aluminum oxide have particles sizes greater than 0.20 micrometers, polishing of a painted surface with same usually leaves a clean but dull surface requiring waxing with a high gloss wax to obtain a glossy surface. Because the instant invention utilizes aluminum oxide having nano particles, another abrasion is provided to clean the painted surface, yet the nanoparticles do not interfere with the waxes thereby leaving a high gloss wax surface produced in a one step by applying the wax and removing same by buffing.

A biocide, such as DANTOGARD (DMDM Hydantoin) or TROYSAN 395 is optionally used as a preservative in the product. The biocide is not a necessary component to provide a functional wax composition for use on wetted surfaces; however, the preservative provides a useful shelf life to the product. The biocide preservative is added in an effective amount to preserve the wax composition product and ranges from 0.01 to 2.0 percent by weight, and more preferably in a range of from 0.05 to 1.0 percent by weight, and more preferably in a range of from between 0.1 and 0.5 percent by weight based on the total weight of the composition. Other preservatives such as polymethoxybicyclic oxazolidine may also be useful in the present invention. It is recommended as an option to add a biocide such as DANTOGARD in an amount up to 1 percent or more preferably in an amount of about 0.12 percent by weight of the total composition as set forth in Example 1. Another biocide which can be added as an option is SURCIDE P in an amount up to 1 percent or more preferably in an amount of about 0.4 percent by weight of the total composition as set forth in Example 2.

Although not required, an effective amount of one or more fragrances, such as vanilla, bubble gum, orange, fruity bouquet and the like may be added to the instant invention to impart a desirable scent to the product. Preferably the fragrance is present in an amount of up to 2 percent by weight, and more preferably of from between 0.001 to 1.0 percent by weight, and more preferably of from between 0.01 to 0.5 percent by weight. One preferred embodiment contains about 0.4 percent by weight of fruity bouquet based on the total weight percent of the composition.

Dyes, fungicides, and/or colorants may also be added to the wax composition in an effective amounts of less than 1 percent by weight based on the total weight of the composition.

EXAMPLES

The following tables provide formulations of cleaning and high gloss wax compositions in accordance with the present invention and provide examples of the range of ingredient percentages by weight providing an effective amount of the particular ingredients deemed necessary to obtain a cleaning wax yielding a high gloss finish in a single application.

One preferred formula for the wax composition of the present invention is set forth in Table I as follows:

Example 1

TABLE I (Water in Oil Emulsion)

| Constituent | Commercial Name | Percent by Weight |
|---|---|---|
| Cationic carnauba wax micro emulsion (15% emulsion) | TOMAH C-340 | 20.0 |
| Dimethyl polysiloxane | | 7.0 |
| Water Soft or Deionized | | 20.9 |
| Alkyl quaternary ammonium montmorillonite | CLAYTONE AF | 1.6 |
| Polyglycerol Ester of Oleic Acid | WITCONOL 14 | 1.0 |
| Isoparaffinic solvent | ISOPAR E | 5.0 |
| Aliphatic hydrocarbons | ODORLESS MINERAL SPIRITS | 40.0 |
| Anhydrous Aluminum Silicate | KAOPOLITE TREATED | 1.5 |
| High Purity Aluminum Oxide (20 micrometer or less) | REYNOLDS RC-UFX MAR | 2.5 |
| Biocide | DANTOGARD | 0.1 |
| Fragrance | Fruity Bouquet | 0.4 |

Another composition useful in the present invention resulting in a product with a solids content of 19.0, specific gravity of 0.907 and flash point of 96° F. is as follows:

Example 2

TABLE II (Water in Oil Emulsion)

| Constituent | Commercial Name | Percent by Weight |
|---|---|---|
| Cationic carnauba wax micro emulsion | TOMAH C-340 | 20.0 |
| Water Soft or Deionized | | 19.1 |
| Dimethyl polysiloxane | SF96 350 cst | 4.2 |
| | SF96 100 cst | 2.0 = 7.0 |
| | 100,000 cst | 0.8 |
| Alkyl quaternary ammonium montmorillonite | CLAYTONE AF | 2.2 |
| Polyglycerol Ester of Oleic Acid | WITCONOL 14 | 1.0 |
| Isoparaffinic solvent | ISOPAR E | 5.0 |
| General Elec Silicon Fluid | SF1706 | 1.0 |
| General Elec Silicon Fluid | SF1550 | 0.5 |
| Aliphatic hydrocarbons | ODORLESS MINERAL SPIRITS | 39.8 |
| Anhydrous Aluminum Silicate | KAOPOLITE TREATED | 0.4 |
| High Purity Aluminum Oxide (20 micrometer or less) | REYNOLDS RC-UFX MAR | 2.5 |
| Fragrance | Fruity Bouquet | 0.4 |

Another composition useful in the present invention resulting in a product with a solids content of 18.4-19.4, specific gravity of 0.890 to 0.910, flash point of 126° F. and viscosity at 70° F. of from 1400-1600 cps RPM 60/Spindle #4 is as follows:

Example 3

TABLE III (Water in Oil Emulsion)

| Constituent | Commercial Name | Percent by Weight |
|---|---|---|
| Cationic carnauba wax micro emulsion | TOMAH C-340 | 20.0 |
| Water Soft or Deionized | | 19.1 |
| Dimethyl polysiloxane | SF96 350 cst | 4.2 |
| | SF96 100 cst | 2.0 |
| | 100,000 cst | 0.8 |
| Alkyl quaternary ammonium montmorillonite | CLAYTONE AF | 2.2 |
| Polyglycerol Ester of Oleic Acid | WITCONOL 14 | 1.0 |
| Isoparaffinic solvent | ISOPAR G | 15.0 |
| | General Elec SF1706 | 1.0 |
| | General Elec SF1550 | 0.5 |
| Aliphatic hydrocarbons | CALUMET 420-460 (LVP 100) | 29.75 |
| Anhydrous Aluminum Silicate | UNICOTE KAOPOLITE SF TREATED | 1.5 |
| High Purity Aluminum Oxide (20 micrometer or less) | REYNOLDS RC-UFX MAR | 2.5 |
| Biocide (Optional) | SURCIDE P | 0.05 |
| Fragrance (Optional) | Fruity Bouquet | 0.4 |

The experimental results set forth in the following Table IV, reveal that the cationic emulsifier and its positive charge is attracted to the negatively charged car surface which becomes slightly hydrophobic attracting the waxes and oils to the surface resulting in a sheeting action due to the quaternary cationic surfactant. The resulting wax formulation formulated with a cationic micro emulsion results in a higher buffing resistance. The data set forth for formulations A-D in Table IV show that when a cationic carnauba micro emulsion is replaced with an ionic carnauba micro emulsion less buffing resistance is observed. In addition, a more stable formulation was observed using the ionic micro emulsion. It is contemplated that an ionic carnauba micro emulsion would also work in the formulations set forth in Examples 1-3 with the other ingredients remaining approximately the same.

TABLE 4

| # | Ingredients | A Weight (%) | B Weight (%) | C Weight (%) | D Weight (%) |
|---|---|---|---|---|---|
| 1 | Clayton AF | 2.2 | 2.2 | 2.2 | 2.2 |
| 2 | OMS | 39.8 | 39.8 | 39.8 | 39.8 |
| 3 | Witconol 14 | 1.0 | 1.0 | 1.0 | 1.0 |
| 4 | Water | 19.1 | 9.1 | 19.1 | 19.1 |
| 5 | Carnauba m/e C6668-111-1 | — | 30 | — | — |
| 6 | Tomah C-340 | 20 | — | — | — |
| 7 | DC-200 350 cst | 4.2 | 4.2 | 4.2 | 4.2 |
| 8 | DC-200 100 | 2.0 | 2.0 | 2.0 | 2.0 |
| 9 | DC-200 100000 | 0.8 | 0.8 | 0.8 | 0.8 |
| 10 | Isopar E | 5.0 | 5.0 | 5.0 | 5.0 |
| 11 | GE SF 1706 | 1.0 | 1.0 | 1.0 | 1.0 |
| 12 | GE SF 1550 | 0.5 | 0.5 | 0.5 | 0.5 |
| 13 | Reynolds RC-UFX MAR | 2.5 | 2.5 | — | — |
| 14 | Reynolds Alumina CR-15 | — | — | 2.5 | — |
| 15 | Reynolds Alumina B 15H45CR | — | — | — | 2.5 |
| 16 | Kaopolite SF Treated | 1.5 | 1.5 | 1.5 | 1.5 |
| 17 | Fragrance | 0.4 | 0.4 | 0.4 | 0.4 |

Preparation of the wax compositions set forth in the previous examples involved adding the alkyl quaternary ammonium montmorillonite and mineral spirits and mixing together, then adding the polyglycerol ester of oleic acid and mixing to obtain a gel. The anhydrous aluminum silicate is added followed by the aluminum oxide and mixed forming a uniform dispersion. The silicone oils are then added and mixing together. The water is then added and the composition mixed well. The carnauba wax micro emulsion is added while mixing until well dispersed then the fragrance and preservative can be added if desired.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented herein above. Rather, what is intended to be covered is within the spirit and scope of the appended claims.

We claim:

1. A wax composition comprising a water in oil emulsion in an effective amount to form a protective wax film on a substrate, comprising:

an aliphatic hydrocarbon solvent;

a wax microemulsion;

a silicone oil comprising at least one liquid dimethylpolysiloxane;

a thickening agent;

an isoparaffinic solvent;

an emulsifying agent;

a polishing agent comprising an anhydrous aluminum silicate;

a polishing agent comprising an aluminum oxide comprising a mean particle size of 0.2 micrometers (200 nm) or less; and the remainder water.

2. The wax composition of claim 1, wherein said silicone oil comprises a blend present in amount of from 8 to 15 percent by weight based on the total weight of the composition.

3. The wax composition of claim 1, wherein said thickening agent is present in an amount of from between 0.1 to 4 percent by weight based on the total weight of the composition.

4. The wax composition of claim 1, wherein said isoparaffinic solvent in an amount of up to 25 percent by weight based on the total weight of the composition.

5. The wax composition of claim 1, wherein said emulsifying agent is present in an amount of from 0.1 to 2 percent by weight based on the total weight of the composition.

6. The wax composition of claim 1, wherein said aliphatic hydrocarbon solvent is present in an amount of from 25 to 45 percent by weight based on the total weight of the composition.

7. The wax composition of claim 1, wherein said polishing agent comprises an aluminum silicate in an amount of from between 1 to 5 percent by weight based on the total weight of the composition.

8. The wax composition of claim 1, wherein said aluminum oxide is present in an amount of from between 1 to 3 percent by weight.

9. The wax composition of claim 1, wherein said emulsifying agent comprises a polyglycerol ester of oleic acid.

10. The wax composition of claim 1, wherein said emulsifying agent is selected from the group committing of a polyglycerol ester of oleic acid, a sorbitan polyoxyethylene, a sorbitan sesquioleate, a sorbitan trioleate, and a polyoxyethylene trioleate.

11. The wax composition of claim 1, wherein said emulsifying agent comprises a long chain fatty alcohol selected from the group consisting of a cetyl alcohol, a stearyl alcohol, an ethoxylated fatty alcohol, a cetyl palmitate, a cetyl myristate, a polyethylene glycol stearate, a glyceryl monostearate, a monolactate, a tallow triglyceride, and a ethoxylated ester.

12. The wax composition of claim 1, wherein said emulsifying agent comprises an ethoxylated ester selected from the group committing of a polyoxyethylene sorbitan monooleate, an alkyl glucosinate, an ethoxylated cetyl alcohol, an ethoxylated stearyl alcohol, and a polyoxyethylene nonylphenol.

13. The wax composition of claim 1, wherein said aliphatic hydrocarbon solvent contains at least 90 percent aliphatic hydrocarbons.

14. The wax composition of claim 1, wherein said aliphatic hydrocarbon solvent contains 0 to 10% hydrocarbons.

15. The wax composition of claim 1, wherein said aliphatic hydrocarbon solvent contains less than 1 percent aromatic hydrocarbons.

16. The wax composition of claim 1, wherein said isoparaffinic solvent in an amount of from 0.01 to 15.0 percent weight based on the total weight of the composition.

17. The wax composition of claim 1, wherein said isoparaffinic solvent comprises a isoparaffin, a paraffinic solvent, a paraffin, and a synthetic isoparaffinic solvent.

18. The wax composition of claim 1, wherein said wax is a natural wax in an amount of from between 0.001 to 6.0 percent by weight solids present in a 12-15 percent emulsion based on the total weight of the composition.

19. The wax composition of claim 1, wherein said wax comprises a 12-15 percent emulsion of a synthetic wax present in an amount of from between 0.001 to 6.0 percent by weight based on the total weight of the composition.

20. The wax composition of claim 1, wherein said wax comprises a 12-15 percent emulsion of a natural wax and synthetic blend present in an amount of from between 0.001 to 6.0 percent based on the total weight of the composition.

21. The wax composition of claim 1, wherein said wax comprises an amount of from between 0.01 to 1.0 percent based on the total weight of the composition.

22. The wax composition of claim 1, wherein said wax has a cationic charge whereby the wax provides a surface-active substance in which the active constituent is the positive ion.

23. The wax composition of claim 19, wherein said synthetic wax is selected from the group consisting essentially of a polyethylene wax, a polypropylene wax, a polyamide wax, and combinations thereof.

24. The wax composition of claim 1, wherein said silicone oil comprises a blend of dimethyl polysiloxanes.

25. The wax composition of claim 1, wherein said silicone oil is emulsified.

26. The wax composition of claim 1, wherein said silicone oil contains a blend of dimethyl polysiloxanes containing amine groups increasing the bonding properties to a substrate surface either through ionic attraction or chemical reaction.

27. The wax composition of claim 1, wherein said thickening agent comprises an alkyl quaternary ammonium montmorillonite.

28. The wax composition of claim 1, wherein said thickening agent is present in an amount of from 1 to 3 percent by weight of the total composition.

29. The wax composition of claim 1, wherein said anhydrous aluminum silicate comprises a kaopolite treated anhydrous aluminum silicate.

30. The wax composition of claim 1, further comprising a biocide.

31. The wax composition of claim 30 wherein said biocide is present in an amount from 0.01 to 2.0 percent by weight based on the total weight of the composition.

32. The wax composition of claim 1, further comprising a preservative.

33. The wax composition of claim 30 wherein said biocide is present in an amount up to 1 percent by weight based on the total weight of the composition.

34. The wax composition of claim 1, further comprising a fragrance.

35. The wax composition of claim 34 wherein said fragrance is selected from the group consisting of vanilla, bubble gum, orange, and fruit.

36. The wax composition of claim 34 wherein said fragrance is present in an amount up to 2 percent by weight based on the total weight of the composition.

37. A wax composition comprising:
a cationic microemulsion of carnauba wax containing 12-15 percent solids of said carnauba wax an amount 0.001 to 6.0 percent by weight based on the total weight of the composition;
a thickening agent comprising an alkyl quaternary ammonium montmorillonite in an amount from 0.1 to 4 percent by weight based on the total weight of the composition;
an isoparaffinic solvent in an amount of from 1.0 to 5.0 percent by weight based on the total weight of the composition;
an emulsifying agent in an amount of from 0.1 to 2.0 percent by weight based on the total weight of the composition;
a silicone oil;
an aliphatic hydrocarbon solvent containing at least 90 percent by weight aliphatic hydrocarbons in an amount of from 25 to 45 percent by weight based on the total weight of the composition;
an anhydrous aluminum silicate in an amount of from 1.0 to 5.0 percent by weight based on the total weight of the composition;
a polishing agent comprising an aluminum oxide having a mean particle diameter of less than 200 nm or less in an amount 1.0 to 3.0 percent by weight based on the total weight of the composition; and
the remainder water.

38. A wax composition consisting essentially of:
a natural wax comprising a cationic microemulsion of carnauba wax containing 12-15 percent solids in an amount up to 1-40 percent by weight based on the total weight of the composition;
a thickening agent comprising an alkyl quaternary ammonium montmorillonite in an amount from 0.1 to 4 percent by weight based on the total weight of the composition;

a isoparaffinic solvent in an amount of from 0.1 to 15 percent by weight based on the total weight of the composition;
an emulsifying agent in an amount of from 0.1 to 2.0 percent by weight based on the total weight of the composition;
a synthetic wax comprising at least one silicone oil in an amount up from 5 to 20 percent by weight based on the total weight of the composition;
an aliphatic hydrocarbon solvent containing at least 90 percent by weight aliphatic hydrocarbons in an amount of from 25 to 45 percent by weight based on the total weight of the composition;

a silicate comprising an anhydrous aluminum silicate in an amount of from 1 to 5 percent by weight based on the total weight of the composition;
a polishing agent comprising an aluminum oxide having a mean particle diameter of less than 200 nm in an amount 0.001 to 8.0 percent by weight based on the total weight of the composition; and
the remainder water.

* * * * *